(12) United States Patent
Merzougui et al.

(10) Patent No.: US 10,385,462 B2
(45) Date of Patent: Aug. 20, 2019

(54) ELECTRODE MATERIAL FOR ELECTROLYTIC HYDROGEN GENERATION

(71) Applicant: Saudi Arabian Oil Company, Dhahran (SA)

(72) Inventors: Belabbes Merzougui, Manchester, CT (US); Bukola Saheed Abidemi, Eastern Province (SA); Mohammad Qamar, Dhahran (SA); Adeola Akeem Akinpelu, Eastern Province (SA); Mohamed Nabil Noui-Mehidi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 325 days.

(21) Appl. No.: 15/147,252

(22) Filed: May 5, 2016

(65) Prior Publication Data

US 2017/0009356 A1    Jan. 12, 2017

Related U.S. Application Data

(60) Provisional application No. 62/190,574, filed on Jul. 9, 2015.

(51) Int. Cl.
*C25B 1/04* (2006.01)
*B01J 23/30* (2006.01)
(Continued)

(52) U.S. Cl.
CPC ............... *C25B 1/04* (2013.01); *B01J 23/30* (2013.01); *B01J 23/755* (2013.01);
(Continued)

(58) Field of Classification Search
CPC .................................. B01J 23/30; B01J 23/755
See application file for complete search history.

(56) References Cited

U.S. PATENT DOCUMENTS

| 2,145,745 A | 1/1939 | Armstrong et al. |
| 3,649,485 A | 3/1972 | Chisholm |
(Continued)

FOREIGN PATENT DOCUMENTS

| DE | 3007503 | 9/1981 |
| WO | 2011/142738 | 11/2011 |

OTHER PUBLICATIONS

E. Bilgen, C. Bilgen, "An assessment of large-scale solar hydrogen production in Canada," International Journal of Hydrogen Energy, 1983, vol. 8, issue 6, 441-451.
(Continued)

*Primary Examiner* — Nicholas A Smith
(74) *Attorney, Agent, or Firm* — Fish & Richardson P.C.

(57) ABSTRACT

Some examples of a method for manufacturing an electrode material for electrolytic hydrogen generation are described. Tungsten salt and nickel salt are mixed in a determined molar ratio on a carbon support by effectively controlling synthesis temperature and composition. Water and adsorbed oxygen, produced by mixing the tungsten salt and nickel salt are removed. Then, methane gas is flowed over the mixture resulting in the electrode material. The electrode material is suitable for use as a catalyst in electrolytic hydrogen generation processes, for example, at an industrial scale, to produce large quantities of hydrogen.

23 Claims, 7 Drawing Sheets

(51) Int. Cl.
  *C25B 11/04* (2006.01)
  *C25B 11/12* (2006.01)
  *B01J 23/755* (2006.01)
  *C01B 32/907* (2017.01)

(52) U.S. Cl.
  CPC ........ *C01B 32/907* (2017.08); *C25B 11/0442* (2013.01); *C25B 11/12* (2013.01); *Y02E 60/366* (2013.01)

(56) References Cited

U.S. PATENT DOCUMENTS

| | | | |
|---|---|---|---|
| 3,943,005 | A | 3/1976 | Mund |
| 4,118,294 | A | 10/1978 | Pellegri |
| 4,873,121 | A | 10/1989 | Struck et al. |
| 5,004,886 | A | 4/1991 | Born |
| 6,593,271 | B1* | 7/2003 | Hayden .............. B01J 20/20 423/445 R |
| 7,842,276 | B1 | 11/2010 | Linkous |
| 2004/0072061 | A1* | 4/2004 | Nakano .............. H01M 4/8605 502/339 |
| 2005/0070427 | A1* | 3/2005 | Pak .............. B01J 21/18 502/182 |
| 2005/0176989 | A1* | 8/2005 | Coleman .............. B01J 21/18 562/11 |
| 2006/0240187 | A1 | 10/2006 | Weidman |
| 2007/0138020 | A1* | 6/2007 | Balagopal .............. C02F 1/4674 205/500 |
| 2009/0074641 | A1* | 3/2009 | Lewis .............. B01D 53/9418 423/213.2 |
| 2010/0252445 | A1 | 10/2010 | Highgate |
| 2010/0256424 | A1* | 10/2010 | Zhang .............. B01J 21/18 568/861 |
| 2012/0061237 | A1 | 3/2012 | Brichese et al. |
| 2012/0065052 | A1* | 3/2012 | Ewald .............. B01J 27/22 502/5 |
| 2014/0154173 | A1 | 6/2014 | Phillips |
| 2014/0162873 | A1* | 6/2014 | Gu .............. C01B 31/12 502/416 |

OTHER PUBLICATIONS

H. Steeb, A. Merrmann, W Seeger and W. Schnurnberger, "Solar hydrogen production: Photovoltaic/electrolyzer system with active power conditioning," International Journal of Hydrogen Energy, 1985, vol. 10, issue 6, 353-358.

F. Harnisch, G. Sievers, U. Schröder, "Tungsten carbide as electrocatalyst for the hydrogen evolution reaction in pH neutral electrolyte solutions," Applied Catalysis B: Environmental, Jul. 2009, vol. 89, issues 3-4, 455-458.

P. D. Tran, S. Y. Chiam, P. Boix, Y. Ren, S. S. Pramana, J. Fize, V. Artero, J. Barber, "Novel cobalt/nickel—tungsten—sulfide catalysts for electrocatalytic hydrogen generation from water," Energy & Environmental Science, issue 8, vol. 6, 2013, pp. 2452-2459.

C. Xu, Y. Liu, and D. Yuan, "Pt and Pd Supported on Carbon Microspheres for Alcohol Electrooxidation in Alkaline Media," International Journal of Electrochemical Science, 2007, vol. 2, 674-680.

I. J. Hsu, Y.C, Kimmel, X. Jiang, B.G. Willis, J.G. Chen, "Atomic layer deposition synthesis of platinum-tungsten carbide core-shell catalysts for the hydrogen evolution reaction," Chemical Communications 2012, vol. 48, issue 7, 1063-1065.

D. V. Esposito, S. T. Hunt, A. L. Stottlemyer, K. D. Dobson, B. E. McCandless, R.W. Birkmire, J.G. Chen, "Low-Cost Hydrogen-Evolution Catalysts Based on Monolayer Platinum on Tungsten Monocarbide Substrates," Chem. Int. Ed. 2010, 49, 9859-9862.

L. Liao, S. Wang, J. Xiao, X. Bian, Y. Zhang, M. D. Scanlon, X. Hu, Y. Tang, B. Liu, H. H. Girault, "A nanoporous molybdenum carbide nanowire as an electrocatalyst for hydrogen evolution reaction," Energy Environ. Sci. 2014, 7, 387-392.

W.-F. Chen, C,-H. Wang, K. Sasaki, N. Marinkovic, W. Xu, J.T, Muckerman, Y. Zhu, R.R, Adzic, "Highly active and durable nanostructured molybdenum carbide electrocatalysts for hydrogen production," Energy Environ. Sci. 2013, 6, 943-951.

H.K. Abdel-Aal, S.M. Sultan, I.A Hussein, "Parametric study for saline water electrolysis: Part II: chlorine evolution, selectivity and determination," Int. J. Hydrogen Energy, 1993, 18(7), 545-551.

International Search Report and Written Opinion issued in International Application No. PCT/US2016/037597 dated Sep. 2, 2016.

Nagai et al., "Tungsten and nickel tungsten carbides as anode electrocatalysts," Electrochmica Acta, Elsevier Science Publishers, vol. 52, No. 17, Mar. 1, 2007, pp. 5430-5436.

Rodella et al., "Physical and chemical studies of tungsten carbide catalysts: effects of Ni promotion and sulphonated carbon," RSC Adv., vol. 5, No. 30, Feb. 24, 2015, pp. 23874-23885.

International Preliminary Report on Patentability in International Application No. PCT/US2016/037597, dated Jan. 18, 2018, 9 pages.

European Patent Office Communication rule 161(1) and 162 EPC in European Application No. 16736306.8, dated Feb. 16, 2018, 3 pages.

Gulf Cooperation Council Examination Report issued in Application No. GC 2016-31681 dated Sep. 16, 2018, 4 pages.

Gulf Cooperation Council Examination Report issued in GCC Application No. GC2016-31681 dated Jan. 22, 2019, 5 pages.

Chinese Office Action issued in Chinese Application No. 201680040381.3 dated Mar. 4, 2019, 15 pages.

European Communication Pursuant to Article 94(3) EPC issued in European Application No. 16736306.8 dated Feb. 12, 2019, 5 pages.

\* cited by examiner

ELECTRODE MATERIAL FOR ELECTROLYTIC HYDROGEN GENERATION

CROSS-REFERENCE TO RELATED APPLICATIONS

This application claims the benefit of priority to U.S. Provisional Application Ser. No. 62/190,574, filed on Jul. 9, 2015 and entitled "Electrode Material for Electrolytic Hydrogen Generation," the contents of which are hereby incorporated by reference.

TECHNICAL FIELD

This disclosure relates to hydrogen generation, for example, by electrolysis.

BACKGROUND

Hydrogen can be produced by several techniques including, for example, steam reforming from hydrocarbons, electrolysis, and thermolysis. Electrolysis of water is the decomposition of water ($H_2O$) into oxygen ($O_2$) and hydrogen ($H_2$) gases due to an electric current being passed through the water. Hydrogen can be produced through photovoltaic/electrolysis systems, alkaline electrolysis, acidic medium electrolysis, methanol oxidation, borohydride solution, or other techniques. Catalysts are often used in electrolytic systems to facilitate hydrogen production. Organic pigments, for example, can be used as catalysts for the release of hydrogen from a hydrogen-rich borohydride solution. Other examples of catalysts include Platinum (Pt). Because industrial quantities of hydrogen can be produced more affordably using hydrocarbons, electrolysis is not frequently used in industrial production of hydrogen.

SUMMARY

This disclosure describes electrolytic hydrogen generation and an electrode material for electrolytic hydrogen generation, for example, from brine water.

Some aspect of the subject matter described here can be implemented as a method. A first quantity of tungsten (W) salt and a second quantity of Nickel (Ni) salt are mixed on a carbon support. Methane gas is flowed over the mixture of the first quantity and the second quantity to form tungsten-nickel carbides (W—Ni—C) on the carbon support. For example, the methane gas is flowed at high temperature. The resulting product was an electrode material suitable for use in electrolytic hydrogen generation, for example, on an industrial scale, to produce large quantities of hydrogen.

This, and other aspects, can include one or more of the following features. The tungsten salt can be dissolved in isopropanol. The nickel salt can be on a carbon support. Water and oxygen can be removed and the methane gas can be flowed over the mixture after removing the water and oxygen. The carbon support can be pre-treated before mixing the first quantity and the second quantity. Pre-treating the carbon support can include removing impurities from the carbon support. Pre-treating the carbon support can include mixing a third quantity of the carbon support with a first volume of hydrochloric acid. The third quantity can include about 0.2 grams (g) of the carbon support. The first volume can include about 40 milliliters (mL). The hydrochloric acid can have a molarity of about 0.5 moles (M). The third quantity can be mixed with the first volume for a duration at a rotational speed. The duration can be about 15 hours. The rotational speed can be about 400 rotations per minute (rpm). Mixing the first quantity of tungsten salt and the second quantity of nickel salt can include selecting the first quantity and the second quantity such that a molar ratio of tungsten salt to nickel salt is about 1:1. The molar ratio of tungsten to nickel can be about 3:1. The first quantity of tungsten salt can consist of $WCl_6$ and the second quantity of nickel salt can consist of $Ni(NO_3)_2 \cdot 6H_2O$. The molar ratio of tungsten to nickel can be about 4:1 or 5:1. Mixing the first quantity of tungsten salt and the second quantity of nickel salt on the carbon support can include several steps. A fourth quantity of the carbon support can be dispersed in a second volume of de-ionized water to form a carbon slurry. The first quantity of tungsten salt can be dissolved in a third volume of isopropanol. The dissolved first quantity of tungsten salt in the third volume of isopropanol can be added to the carbon slurry. A fourth volume of de-ionized water can be added to the mixture of the tungsten salt in the carbon slurry. A mixture of the fourth volume of de-ionized water and the mixture of the tungsten salt in the carbon slurry can be stirred for a duration. The mixture of the fourth volume of the de-ionized water and the mixture of the tungsten salt in the carbon slurry can be vacuum dried after the duration. After removing the water and the adsorbed oxygen, flowing the methane gas over the mixture of the first quantity and the second quantity can include increasing a temperature of the mixture to about 1000° C. The temperature can be increased at a rate of about 5 degree Centigrade per minute (° C./min). The temperature of the mixture can be held for a respective duration at each of about 700° C., about 800° C., about 900° C. and about 1000° C. The carbon support can be conductive and hydrophobic. After removing the water and adsorbed oxygen and flowing the methane gas over the mixture of the first quantity and the second quantity, the mixture can be used as an electrode material, for example, as a catalyst, for hydrogen generation from brine by electrolysis. The mixture of the first quantity and the second quantity can be a nickel-tungsten carbide alloy. A surface area of the carbon support can range between about 50 square meters per gram ($m^2/g$) to about 3000 $m^2/g$.

Some aspects of the subject matter described here can be implemented as an electrode material for electrolytic hydrogen generation from brine including tungsten-nickel carbide (W—Ni—C) on a carbon support. The tungsten-nickel carbide has a molar ratio of tungsten to nickel of between 1:1 and 5:1.

This, and other aspects, can include one or more of the following features. The molar ratio can be about 1:1, about 2:1, about 3:1, about 4:1 or about 5:1. The carbon support can have a surface area between 50 $m^2/g$ to about 3000 $m^2/g$. The tungsten-nickel carbides on the carbon supports can have a particle size ranging between about 10 nanometers (nm) and 100 nm. The electrode material can be formed by mixing a first quantity of tungsten (W) salt and a second quantity of nickel (Ni) salt in the presence of a carbon support and flowing methane gas over the mixture of the first quantity and the second quantity to form tungsten-nickel carbides (W—Ni—C) on said carbon support. The first quantity of tungsten salt can consist of $WCl_6$ and the second quantity of nickel salt can consist of $Ni(NO_3)_2 \cdot 6H_2O$. The mixture can have water and oxygen removed prior to flowing methane gas over the mixture. The tungsten salt can be dissolved in isopropanol and the nickel salt can be provided on the carbon support. The methane gas flowing over the mixture can increase a temperature of the mixture to about 1000° C.

The details of one or more implementations of the subject matter described in this specification are set forth in the accompanying drawings and the description later. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Electrolytic or photo-catalytic hydrogen production (or both) from brine water can be an improvement relative to other industrial hydrogen production techniques, for example, in terms of cost and environmental impact. Such hydrogen production techniques use energy that is high enough to dissociate water molecules and release hydrogen. The type of surface on which the dissociation occurs affects significantly the quantity of energy used. Also, energy cost can be affected by using a catalyst that can lower the over voltage of the electrolytic process to produce hydrogen from brine.

Precious metals, for example, platinum (Pt), which are used as catalysts in electrolysis, offer low over potential and faster reaction kinetics for hydrogen evolution reaction (HER). However, such metals, particularly Pt, can be expensive and, consequently, prohibitive for application for hydrogen production from brine on an industrial scale. For example, it is known that coating Pt on Tungsten Carbide (WC), for example, by atomic layer deposition or physical vapor deposition, can reduce Pt loading, but is a complicated process that is difficult to be scaled up to industrial levels.

This disclosure describes electrolytic hydrogen generation and an electrode material for electrolytic hydrogen generation. The electrode material described here can be implemented as an efficient electro-catalyst for hydrogen generation from brine, for example, at industrial levels. As described later, the electrode material is prepared from materials that are abundantly available on earth. The electrode material described here shows significant reduction in over-potential for HER in brine electrolysis. The resulting electrode material can be based on a nano-structured electro-active material and can be implemented as a catalyst in brine electrolysis and can serve as a cost-effective, stable and active alternative to expensive, precious metals, for example, Pt.

In some implementations, the electrode material can include tungsten-nickel based carbides, for example, $W_x$—$Ni_y$—C, WC, $W_2$C, or other tungsten-nickel based carbides, prepared by effectively controlling the synthesis temperature and composition. As described later, such mixtures have shown excellent electro-activeness toward hydrogen evolution reaction from brine with an electrode performance close to that of Pt-based catalysts.

Figure 1:
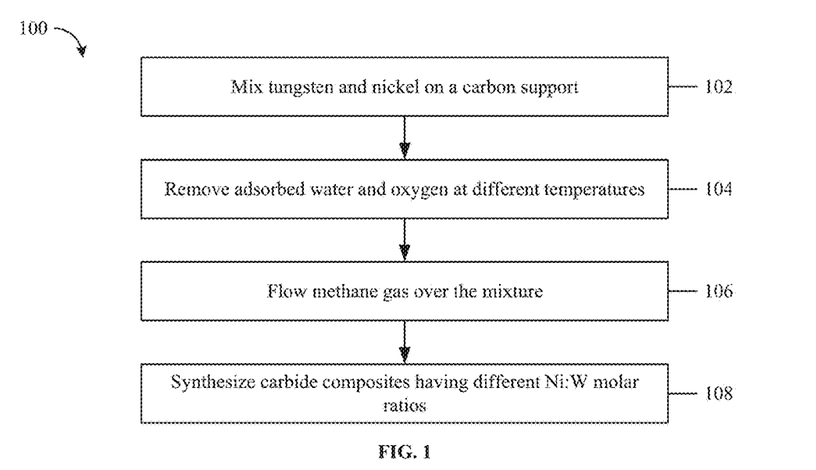
FIG. 1 is a flowchart of an example process for producing electrode materials.

FIG. 1 is a flowchart of an example process 200 for producing electrode materials. In some implementations, the process 100 can be implemented using the system 100. At 102, tungsten (W) salt is mixed with nickel (Ni) salt on a carbon support. For example, $WCl_6$, is mixed with Ni $(NO_3)_2 \cdot 6H_2O$ on a carbon support, for example, a conductive and hydrophobic carbon support, such as Vulcan XC-72R in a container 102. In some implementations, a surface area of the carbon support can range between about 50 $m^2$/g to about 3000 $m^2$/g. At 104, water and adsorbed oxygen are removed from the mixture prior to heating at different temperatures, for example, 700° C., 800° C., 900° C., 1000° C. or other temperatures. For example, the mixture resulting by implementing step 102 can be kept in a container 104 having an inert atmosphere, for example, $N_2$ atmosphere. Then, at 106, low flow of CH4 gas, for example, from a CH4 gas source 106, can be passed over the mixture to form the carbides at higher temperature, >700° C. For example, the methane gas can be flowed at a low flow rate, for example, 100 milliliters per minute (mL/min) for a reactor of about 5 centimeter ( )m diameter. At 108, a carbide composite having a specified mole ratio can be synthesized. For example, the mole ratios of Ni to W can be about 1:1, 1:3, 1:4, 1:5 or other mole ratios. In general, the tungsten-nickel carbides can be represented as $W_x$—$Ni_y$ in carbide form with x being about 50% to 75% atomic and y being about 50% to 25% atomic. In some examples, x can range between 75% and 80%, and y can range between 20% and 25%. In some implementations, the carbide composites can be characterized and also prepared in the form of electrodes, and tested for HER in brine medium using a two or three-electrode electrolytic cell implementation. Experiments described later are performed on a laboratory-scale, but can be scaled up to industrial levels to produce large quantities of the electrode materials.

EXPERIMENT I

Pre-treatment of Carbon Support

Figure 2:
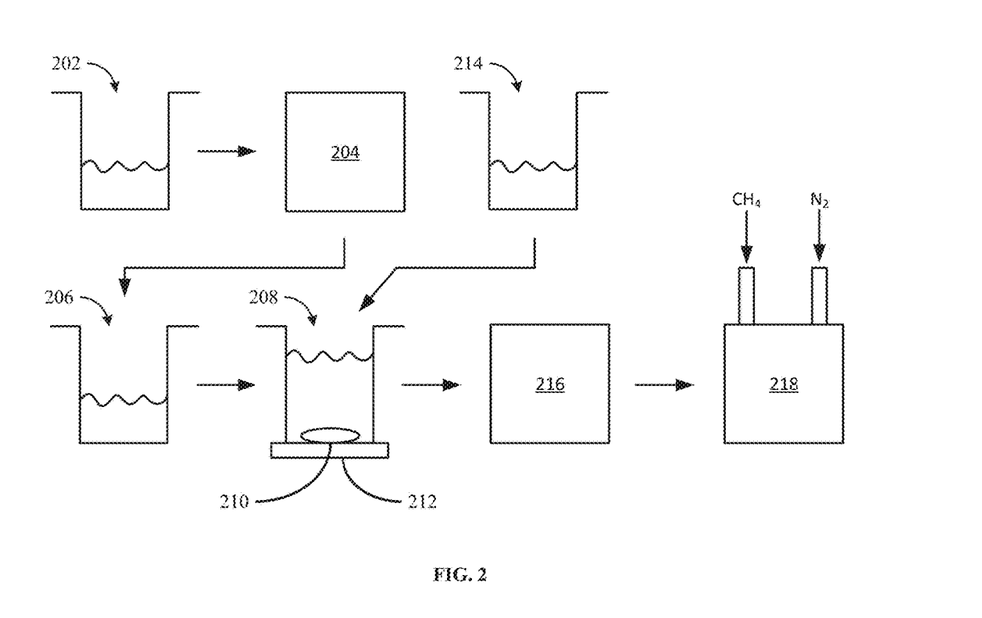
FIG. 2 shows a schematic diagram of an example system for producing electrode materials.

FIG. 2 shows a schematic diagram of an example system for producing electrode materials. Initially, Vulcan XC-72R carbon support was pre-treated to remove traces of any impurities, such as metals. In a container 202, a quantity of 0.2 g of the Vulcan XC-72R was mixed in 40 mL of 0.5 M hydrochloric acid (HCl) for a duration of approximately 15 hrs at moderate temperature (20° C.-40° C.), while stirring at 400 rpm, for example, using a magnetic stirrer. The quantity of carbon support, for example, Vulcan XC-72R, ranged from 0.3 g to 0.4 g during pre-treatment in acid. In general, a quantity of carbon support used can depend on an amount of electrode material, for example, catalyst, to be produced. After carbon cleaning, for example, by the pre-treatment described here, in acid to remove traces of impurities, for example, metals or other impurities, 0.2 g of treated carbon was used to develop the carbide materials on the carbon surface. The amount of carbon used can be more than the amount of carbon needed to account for carbon loss. The carbon support was then filtered, washed and dried in an oven 204 at 80° C. for 6-7 hrs.

EXPERIMENT II

Preparation of Electrode Material Having Ni:W in a 1:1 Ratio

To prepare the electrode material, 0.2 g of Vulcan carbon, pre-treated as described earlier, was dispersed in a container 206 containing 40 mL de-ionized water by sonication for 20-30 minutes, and then transferred to a glass beaker 208 with magnetic stirrer 210 (rotated by a stir plate 212) to form a carbon slurry. Thereafter, 0.4 g of $WCl_6$ dissolved in a container 212 containing 30 mL isopropanol (IPA) was slowly added to the carbon slurry. To maintain an atomic ratio of Ni:W or 1:1, 0.29 g of $Ni(NO_3)_2 \cdot 6H_2O$ was dissolved in a container 214 containing 20 mL of de-ionized $H_2O$ and added, drop-wise, to the mixture in the container 208, followed by a final rinse with 10 mL of de-ionized $H_2O$ to make-up 100 mL of reaction volume. The mixture was left under stirring at 500 rpm for 2-3 days for proper impregnation of metal salts onto the carbon matrix. The mixture was then vacuum-dried at 80° C. between 6 and 7 hrs in an oven 216.

The resulting sample was heat-treated as follows. The powdered sample was placed in a crucible boat and transferred into a quartz tube MTI furnace 218 (OTF-1200X-S). Gas cylinders were connected to the gas inlet of the furnace and the exhaust/outlet was directed to an oil bath. Nitrogen ($N_2$) gas was first passed into the furnace while the temperature was first increased from room temperature to 100° C. for 30 minutes and held at this temperature for 10 minutes to purge out adsorbed oxygen and water. Methane ($CH_4$) gas flow was then passed while ramping temperature of the furnace at a rate of 5° C./min to the desired temperatures of 700° C., 800° C., 900° C. or 1000° C., and held for 1 hr. In general, a quality of the sample is affected by a ramping period, that is, the time to reach a set temperature value at which catalyst formation begins and a temperature hold period, that is, the time for which the temperature is held for catalyst active sites formation.

Subsequently, some of the samples synthesized at Ni:W ratio of 1:1 were cooled and used to study the effect of temperature on HER performance, as described later. In some implementations, the samples can be cooled at any rate. For example, the cooling can be done under ambient conditions without an external cooling system. In some implementations, external cooling systems can be used to cool the samples at cooling rates ranging between about 5° C./min and 10° C./min. In some implementations, the cooling can be implemented by simply turning off the heating chamber in which the samples are heated. Cooling can be done under the flow of methane or an inert gas to avoid leak of oxygen into reactor.

EXPERIMENT III-V

Preparation of Electrode Material Having Ni:W in a 1:3, 1:4 and 1:5 Ratio, Respectively To prepare the electrode material having Ni:W in ratios of 1:3, 1:4 and 1:5, 1.2 g, 1.6 g and 2.0 g of $WCl_6$, respectively, was mixed with 0.29 g of Vulcan carbon, pre-treated as described earlier. The electrode material in each of these ratios was prepared by processing each mixture in a manner similar to that described earlier. Each obtained sample was characterized using a thin film electrode in a three-electrode geometric cell and also by spectroscopic techniques to investigate the morphological structure and composition of each sample.

For each sample prepared as described later, HER activity in brine were studied, as described later.

EXPERIMENT VI

Studying HER Activity in Brine

For each sample prepared as described earlier, approximately 5 mg of the sample was dispersed in a mixture of water and isopropanol (30% V/V) and 37 μL of 1.66% wt Nafion® (prepared from 5% wt). The mixture was sonicated to obtain a uniform ink. The working electrode used during electrolysis was prepared by depositing 16 μL of the ink suspension on the pre-cleaned glassy carbon substrate and allowed to dry under air flow at room temperature. The loading operation was repeated until the desired catalyst loading, 0.4 mg/cm² was achieved and the geometric area of the glassy carbon rotating disk electrode (RDE) was about 0.196 cm². A Pt mesh was used as a counter electrode during activity measurements in brine (0.5 M NaBr, pH~7.04, specific gravity~1.54). A Calomel electrode (calibrated against reversible hydrogen electrode every day prior to activity measurement of HER) was used as a reference electrode. All potential measurements during these studies were converted to reversible hydrogen electrode (RHE).

RESULTS

HER Activity in Brine

Figure 3A:
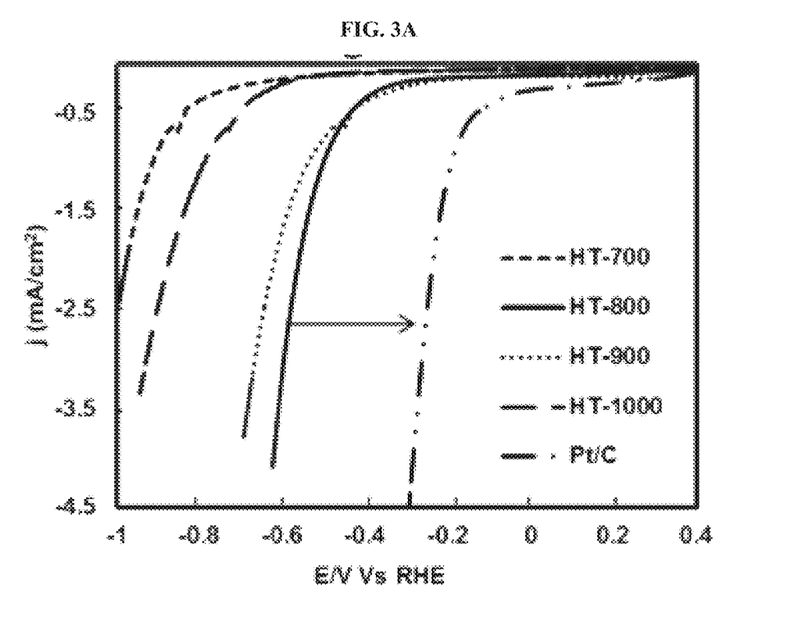
FIG. 3A shows Hydrogen Evolution Reaction (HER) Polarization curves in W—Ni—C/Vu (1:1) at different heat treatment temperature.

FIG. 3A shows HER polarization curves for Ni:W in a mole ratio of 1:1 at different heat treatment temperatures in the presence of methane gas flow. The polarization curves show that sample treated at 800° C. shows better HER activity than the other samples with an over-voltage of 300 millivolt (mV) as compared to Pt/C catalyst. This can indicate that formation of more active sites for HER for the specific composite is more favorable at this temperature.

Figure 3B:
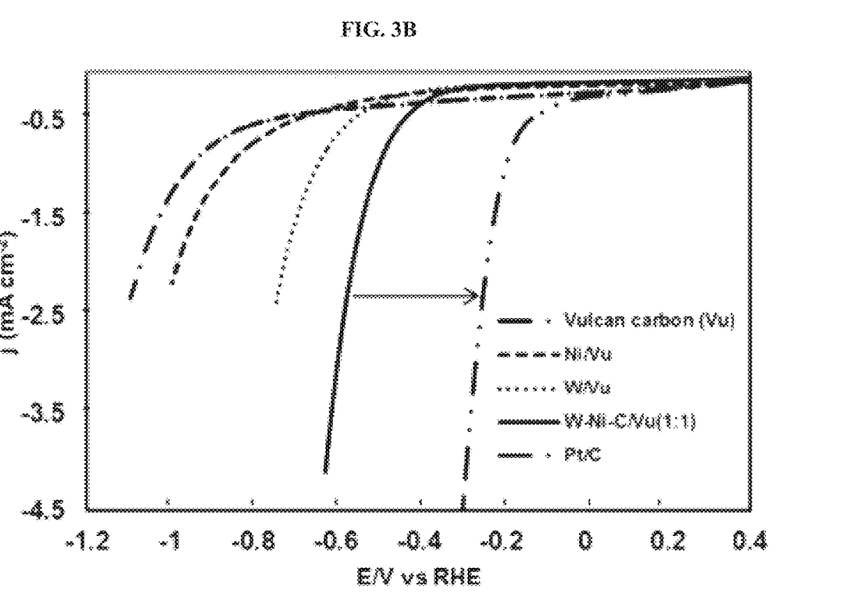
FIG. 3B shows HER Polarization curves in Vulcan carbon (Vu), Ni/Vu, W/Vu, W—Ni—C/Vu (1:1) and Pt/C respectively.

FIG. 3B shows HER polarization curves obtained for individual metal carbides. Vulcan carbon shows the highest over potential for HER. WC/Vu behaves better than its homologue, NiC/C. A significant improvement in HER activity is observed when both metals are incorporated at 1:1 mole ratio of Ni:W.

Figure 3C:
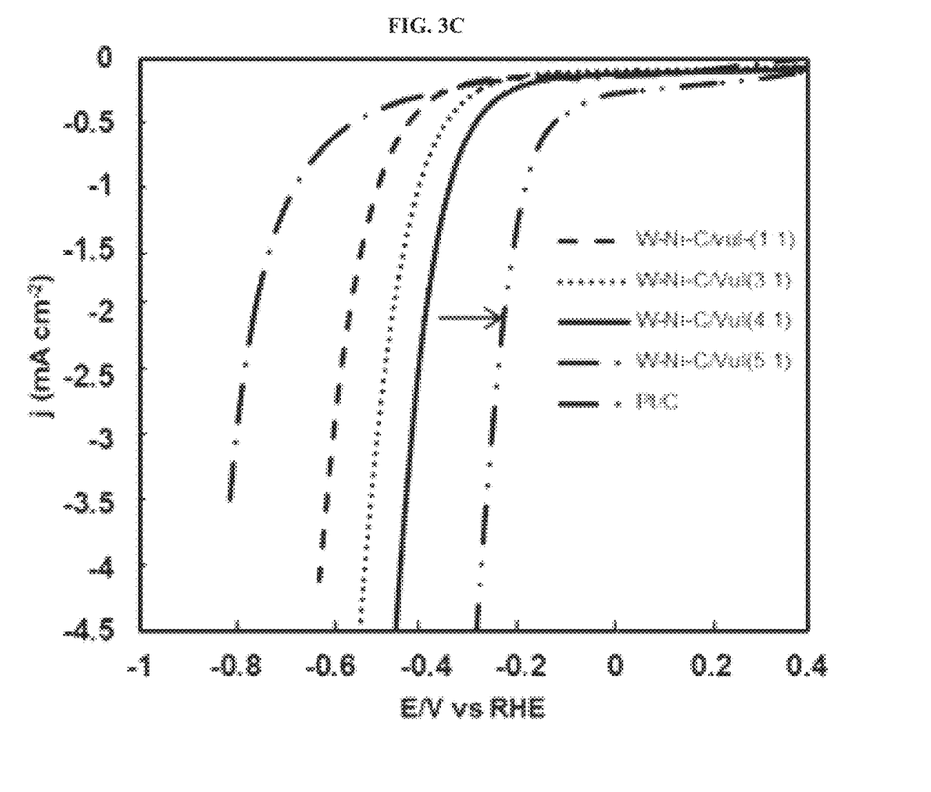
FIG. 3C shows HER Polarization curves in W—Ni—C/Vu at different mole ratio of Ni:W.

FIG. 3C shows HER polarization curves in brine for the carbide composites including two metals. The polarization curves were generated to study if the electro-catalytic synergistic effect of the two metals increased the HER performance of the carbide composite. An increase in current density and a reduction in over-potential were observed with HER activity close to that of bulk Pt/C. When the mole ratio of Ni:W was optimized from 1:1 to 1:4, a corresponding reduction in over potential was significant. However, when the ratio is 1:5, a drastic reduction in activity of the catalyst toward HER in brine was noticed suggesting that the best molar ratio of Ni:W to lead to metal carbide alloys as potential Pt-free electro-catalyst for HER is 1:4. Such enhancement in HER activity may be due to effective utilization of the synergistic effect of the two metals that favor faster HER kinetics.

EXPERIMENT AND RESULTS

Catalyst Stability

Figure 4A:
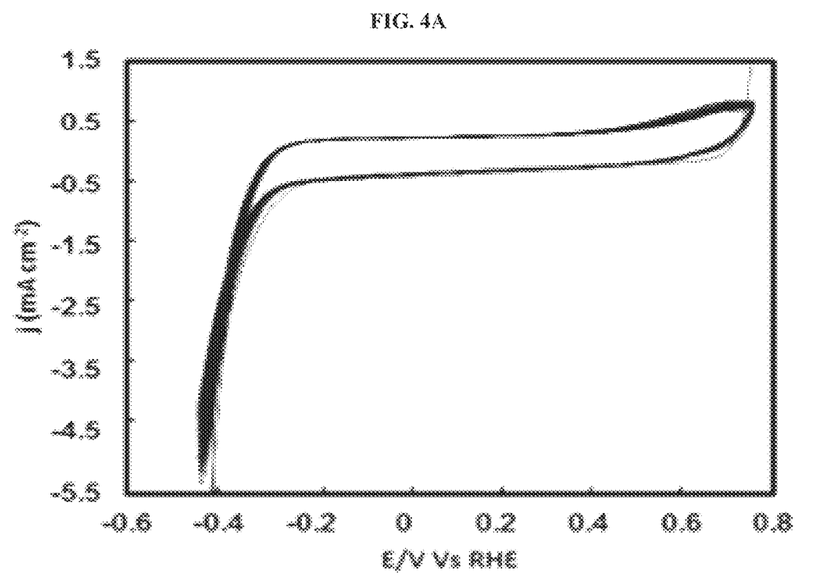
FIG. 4A shows polarization curves of W—Ni—C/Vu (4:1) in $N_2$ saturated 0.5 M NaBr, pH~7.04 with consecutive cyclic volt-ammograms recorded, potential scan rate of 50 mV/s.
Figure 4B:
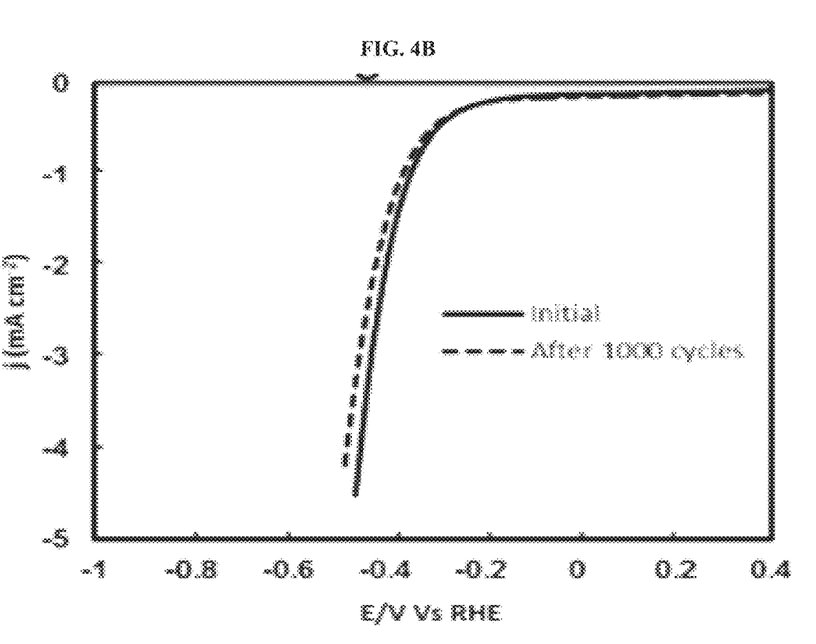
FIG. 4B shows polarization curves of W—Ni—C/Vu (4:1) in $N_2$ saturated 0.5 M NaBr, pH~7.04 before and after 1000 potential sweeps (−0.45 to +0.75 V/RHE), potential scan rate of 20 mV/S.
Figure 4C:
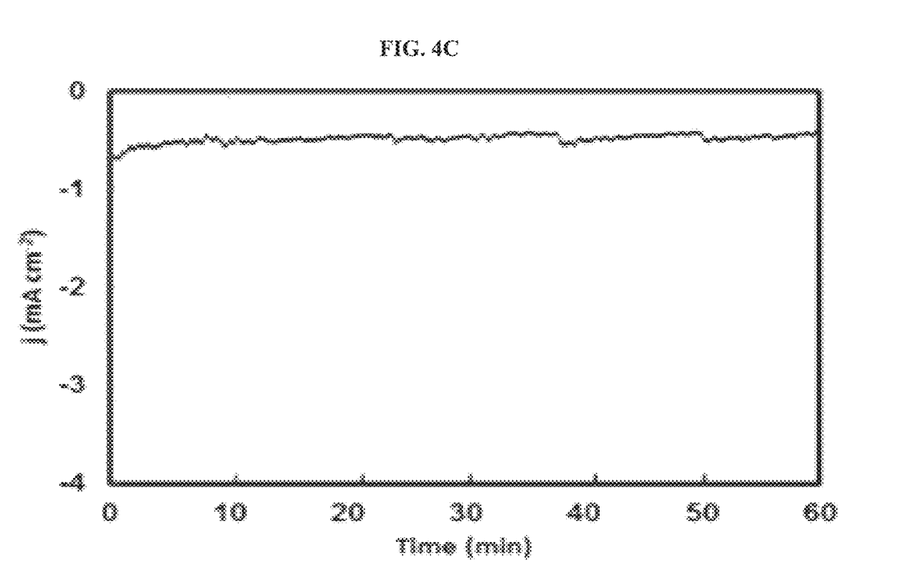
FIG. 4C shows chrono-amperometry curves of W—Ni—C/Vu (4:1) in $N_2$ saturated 0.5 M NaBr, pH~7.04 at −0.37 V/RHE.

For stability studies, the catalyst that demonstrated highest HER activity, that is, Ni:W in a molar ratio of 1:4 (for example, W—Ni—C/Vu in a 4:1 ratio), was used. To investigate the long term performance for the catalyst in brine, potential sweeps were conducted from −0.45 to +0.75 V/RHE for 1000 cycles as shown in FIG. 4A. FIG. 4B shows the polarization curve recorded before and after the stability test. The catalyst demonstrated good stability by maintaining almost its initial polarization behavior in brine medium. To further establish the catalyst stability, chrono-amperometry (CA) studies was also conducted at a potential hold of −0.37 V/RHE (corresponding to j=1 mA cm$^{-2}$) for 1 hr as shown in FIG. 4C.

Scanning Electron Microscope (SEM) Images and X-Ray Diffraction

Figure 5A:
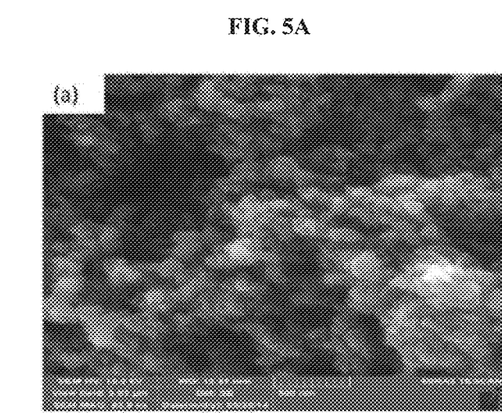
FIGS. 5A-5D show Scanning Electron Microscope (SEM) images of electrode materials of different Ni:W molar ratios.
Figure 5B:
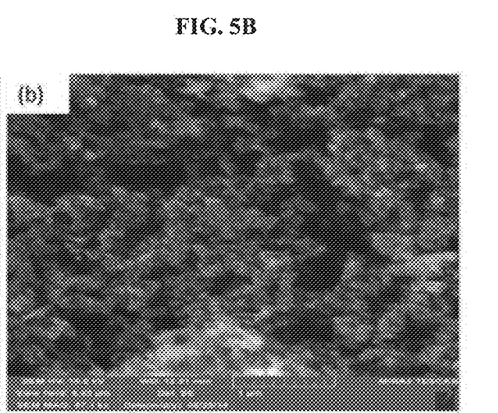
Figure 5C:
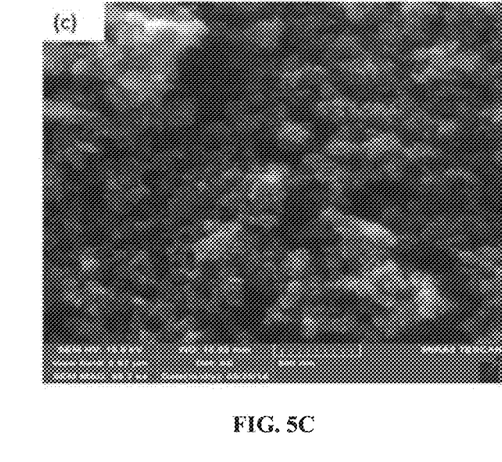
Figure 5D:
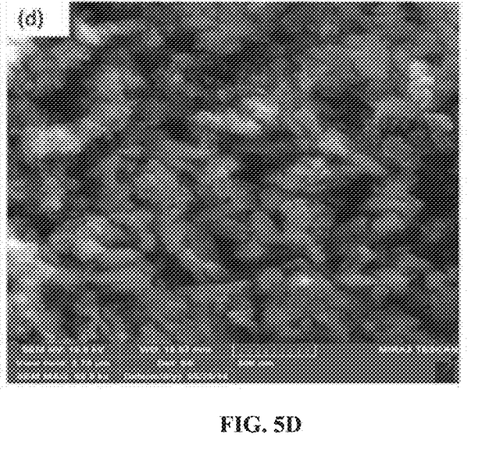

FIGS. 5A-5D are Scanning Electron Microscope (SEM) images of electrode materials of different Ni:W molar ratios. FIG. 5A is the SEM image of the composition having W:Ni in a 1:1 ratio. FIG. 5B is the SEM image of the composition having W:Ni in a 3:1 ratio. FIG. 5C is the SEM image of the composition having W:Ni in a 4:1 ratio. FIG. 5D is the SEM image of the composition having W:Ni in a 5:1 ratio. The composite with molar ratio of W:Ni of 5 to 1 (FIG. 5D) appears to be more dense than those corresponding to ratios, 4:1, 3:1, and 1:1. The difference in density maybe the reason that HER activity was decreased significantly for this composition relative to the other compositions.

Figure 6A:
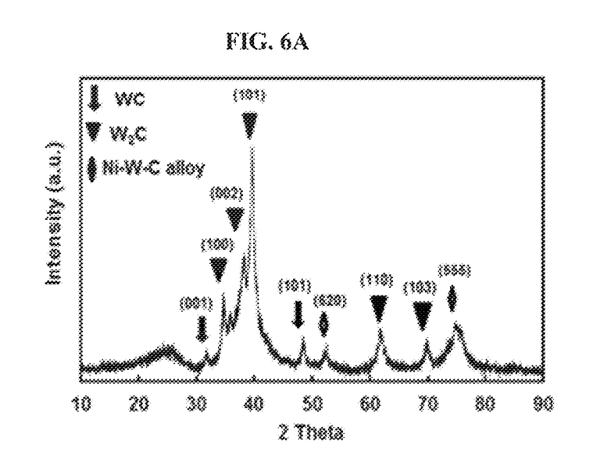
FIGS. 6A-6D show X-Ray diffraction patterns of synthesized catalysts at different mole ratios atomic of Ni to W.
Figure 6B:
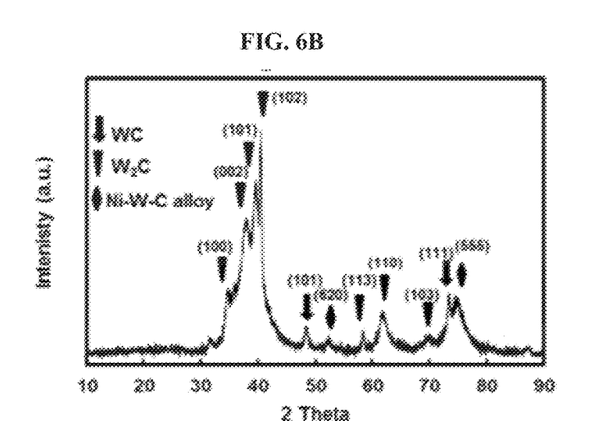
Figure 6C:
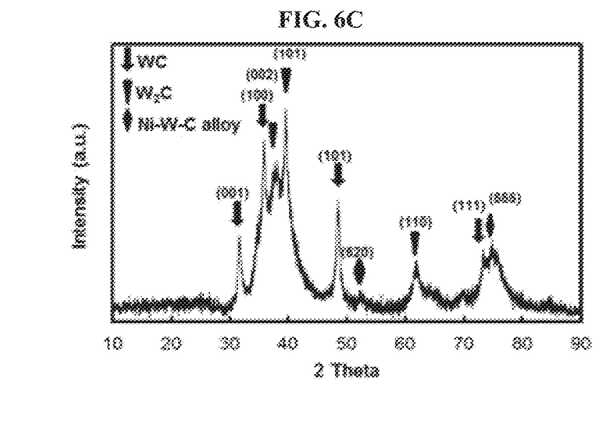
Figure 6D:
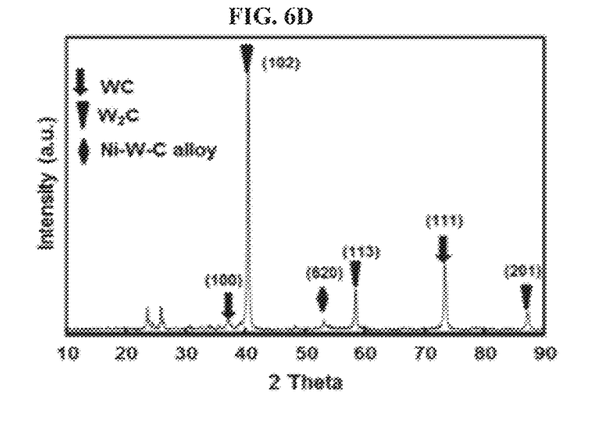

FIGS. 6A-6D show X-Ray diffraction patterns of synthesized catalysts at different mole ratios atomic of Ni to W. FIG. 6A is an XRD pattern of catalyst having W:Ni in a 1:1 ratio. FIG. 6B is an XRD pattern of catalyst having W:Ni in a 3:1 ratio. FIG. 6C is an XRD pattern of catalyst having W:Ni in a 4:1 ratio. FIG. 6A is an XRD pattern of catalyst having W:Ni in a 5:1 ratio. The XRD patterns of the synthesized catalysts show formations of mixture of metal carbides of tungsten metal (WC and W$_2$C) and W—Ni carbides alloys at different diffraction angles. The unassigned peak in the XRD figure corresponds to Carbon (002) plane.

In summary, the electrode material described here can serve as a cost effective and cheaper alloy material that can be used for hydrogen formation from brine through electrolysis. The alloy composition described here can allow hydrogen formation at high rates. The alloy composition can replace relatively more expensive, precious metals, for example, Pt.

Thus, particular implementations of the subject matter have been described. Other implementations are within the scope of the following claims.

The invention claimed is:

1. A method comprising:
   mixing a first quantity of tungsten (W) salt and a second quantity of nickel (Ni) salt in the presence of a carbon support; and
   flowing methane gas over the mixture of the first quantity and the second quantity to form tungsten-nickel carbides (W—Ni—C) on said carbon support,
   wherein the molar ratio of tungsten to nickel is about 4:1.
2. The method of claim 1, wherein the tungsten salt is dissolved in isopropanol.
3. The method of claim 1, wherein the nickel salt is on the carbon support.
4. The method of claim 1, further comprising removing water and oxygen, flowing the methane gas over the mixture after removing the water and the oxygen.
5. The method of claim 4, wherein, after removing the water and the oxygen, flowing methane gas over the mixture of the first quantity and the second quantity comprises increasing a temperature of the mixture to about 1000° C.
6. The method of claim 5, further comprising increasing the temperature at a rate of 5° C/min.
7. The method of claim 5, further comprising holding the temperature of the mixture for a respective duration at each of about 700° C., about 800° C., about 900° C. and about 1000° C.
8. The method of claim 5, further comprising, after removing the water and the oxygen and flowing the methane gas over the mixture of the first quantity and the second quantity, using the mixture as an electrode material for hydrogen generation from brine by electrolysis.
9. The method of claim 1, further comprising pre-treating the carbon support before mixing the first quantity and the second quantity.
10. The method of claim 9, wherein pre-treating the carbon support comprises removing impurities from the carbon support.
11. The method of claim 9, wherein pre-treating the carbon support comprises mixing a third quantity of the carbon support with a first volume of hydrochloric acid.
12. The method of claim 11, wherein the third quantity comprises about 0.2 g of the carbon support.
13. The method of claim 11, wherein the first volume comprises about 40 mL.
14. The method of claim 11, wherein the hydrochloric acid has a molarity of about 0.5M.
15. The method of claim 11, further comprising mixing the third quantity with the first volume for a duration at a rotational speed.
16. The method of claim 15, wherein the duration is about 15 hours.
17. The method of claim 15, wherein the rotational speed is about 400 rpm.
18. The method claim 1, wherein the first quantity of tungsten consists of WCl$_6$ and the second quantity of nickel consists of Ni(NO$_3$)$_2$.6H$_2$O.
19. The method of claim 1, wherein mixing the first quantity of tungsten (W) salt and the second quantity of nickel (Ni) salt on the carbon support comprises:
   dispersing a fourth quantity of the carbon support in a second volume of de-ionized water to form a carbon slurry;
   dissolving the first quantity of tungsten salt in a third volume of isopropanol;
   adding the dissolved first quantity of tungsten salt in the third volume of isopropanol to the carbon slurry;
   adding a fourth volume of de-ionized water to the mixture of the tungsten salt in the carbon slurry;
   stirring a mixture of the fourth volume of de-ionized water and the mixture of the tungsten in the carbon slurry for a duration; and vacuum drying the mixture of the fourth volume of de-ionized water and the mixture of the tungsten salt in the carbon slurry after the duration.

20. The method of claim 1, wherein the carbon support is conductive and hydrophobic.

21. The method of claim 1, wherein flowing methane through the mixture produces a nickel-tungsten carbide alloy.

22. The method of claim 21, wherein the tungsten-nickel carbides on the carbon supports have a particle size ranging between about 10 nanometers (nm) and 100 nm.

23. The method of claim 1, wherein a surface area of the carbon support ranges between about 50 $m^2$/g to about 3000 $m^2$/g.

* * * * *